Patented Oct. 9, 1928.

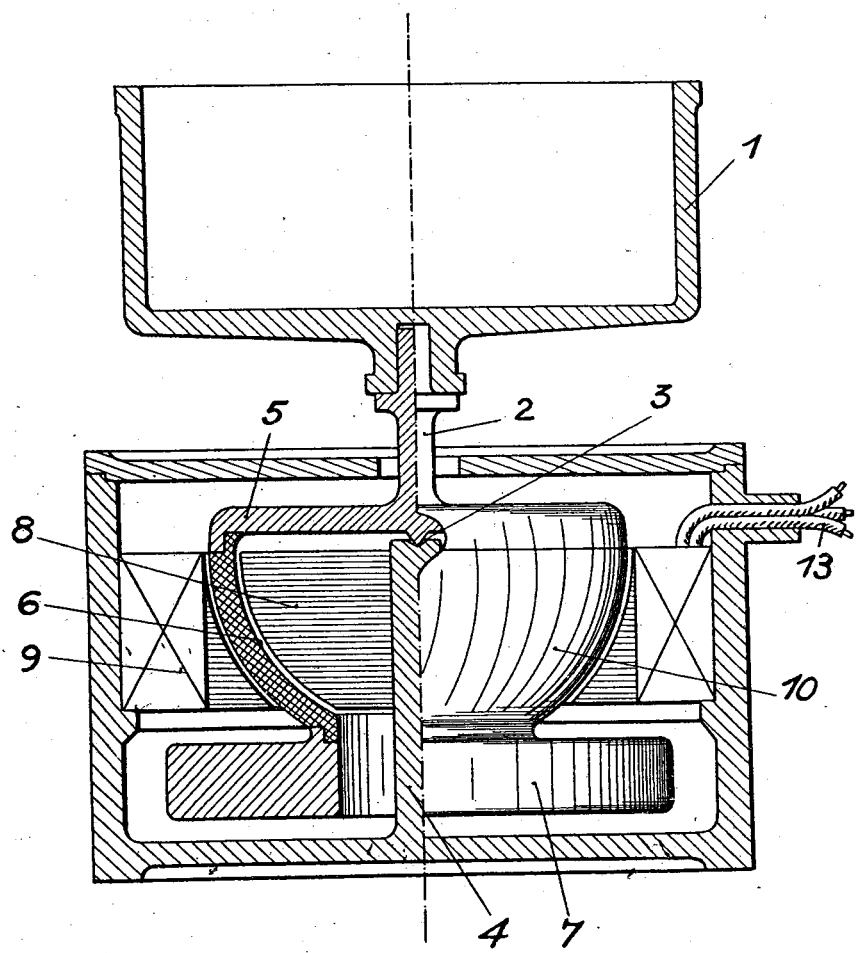

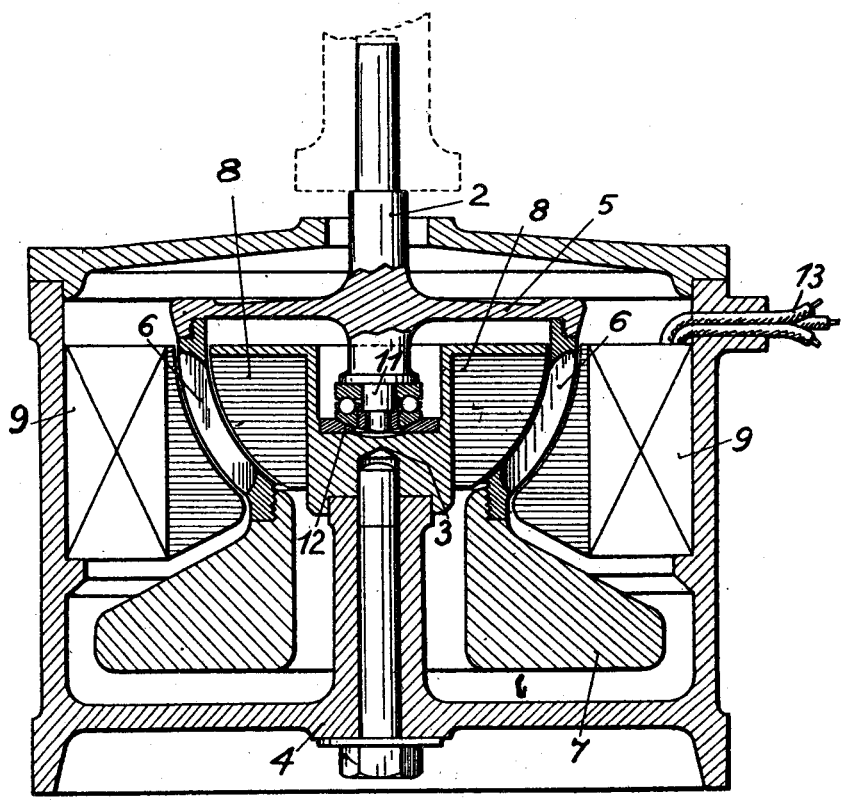

1,687,039

UNITED STATES PATENT OFFICE.

HENDRIK ARNOLD ROMP, OF ARNHEM, NETHERLANDS, ASSIGNOR TO NAAMLOOZE VENNOOTSCHAP NEDERLANDSCHE KUNSTZIJDEFABRIEK, OF ARNHEM, NETHERLANDS.

MOTOR FOR DRIVING HYDRO-EXTRACTORS.

Application filed May 3, 1926, Serial No. 106,530, and in the Netherlands February 13, 1926.

My invention relates to motors for driving centrifuges and has for its object to provide a motor for this purpose, which is very compact and therefore takes up little space, while it has very great stability. The number of component parts is relatively small, which increases the reliability in working.

The new motor according to my present invention is particularly suitable for driving centrifuges such as are used in the artificial silk industry and in which—as is known—it is of the greatest importance to prevent oscillations, since vibrations have a detrimental effect on the quality of the artificial silk.

In the known motors of this type the rotor shaft must not perform any lateral movements, as the rotor would otherwise come in contact with the stator, since the pole pieces on the stator usually only provide a clearance of about 0,5 mm. for the cylindrical rotor. Such motors have for this reason usually been built with two fixed bearings, a spherical joint outside the said fixed bearings and a spring supporting bearing.

According to my present invention a great simplification in the construction is effected, by the shaft of the hydro-extractor being supported by a single bearing only and by provision being made for ensuring the stability of the shaft by other means than a spring supported bearing.

According to my invention this stabilization may be produced among others by providing on the shaft of the hydro-extractor a spherical cage or rotor.

The stability may be further increased by the provision of a weight on the under side of the cage or rotor.

My present invention also includes a constructional form, in which the shaft of the hydro-extractor is supported in a rotary manner, such that the cage is capable of swinging about the centre of its spherical bounding surfaces.

Finally the core disposed within the spherical rotor and the pole-pieces disposed externally of the same may be provided with spherical bounding surfaces.

My invention is more particularly described below with reference to the constructional examples of a motor for driving a hydro-extractor shown in the accompanying drawings. It is to be understood, however, that the constructional features as shown are given by way of examples only and that several alterations are possible without departing from the scope of my invention.

Fig. 1 shows a motor according to my invention, partly in section and partly in elevation.

Fig. 2 is a section through a motor according to my invention showing a spherical bearing supporting the shaft.

A hydro-extractor 1 is mounted in any suitable manner on a shaft 2, which is supported in the point 3 by a column 4. In the example shown in Figure 1, the shaft 2 has a discoidal part 5 provided with a cage or rotor 6 which, as shown in the drawing, may be provided with a weight in the form of a disc 7. The discs 5 and 7 in the examples shown are made of a different metal to the rotor 6. The core 8 consists of a laminated body, which may for instance be fixed to the column 4. Outside the cage or rotor 6 are the stator windings 9. The cage or rotor 6 consists of soft steel and is provided with radial saw cuts 10, which are distributed over the surface and favorably influence the induced currents.

As will be seen from the drawings, the rotor 6, the core 8 and the pole pieces of the stator 9 are provided with spherical bounding surfaces, the centres of which practically coincide with the point of support 3 of the shaft 2. In the example shown in Figure 1 this support is indicated as a point which rests in a spherical depression on the column.

Obviously this support might be constructed in some other way, for instance a spherical bearing 11 might be used, as shown in Figure 2, having a convex spherical surface 12 which can turn freely in an accurately ground concave spherical depression. Although such a construction is preferred, any bearing may be used having freedom of movement in two directions.

On the hydro-extractor being started, the current which is led in through wires 13 will put the rotor 6 in motion. The electromagnetic lines of force flow between the pole pieces of the stator windings 9 and the core 8, and through the rotor 6. Since the shaft 2 deviates from its perpendicular position, the rotor 6 will tilt down, for instance to the left of the drawing. The lines of force passing between the stator windings 9 and the core 8 will then have the influence of pulling the rotor 6 in an upward direction restoring it to perpendicular position. When the hydro-extractor is at rest or on the current being interrupted, the weight 7 will still have a stabilizing effect.

It follows from what has been said, that the arrangement according to my present invention has among other advantages that of being particularly compact. As compared with the known motors of this kind, in which a spring supported bearing is used, the motor according to the present invention has the further advantage that no faults can develop, which would eventually occur through the varying stressing of the said springs.

The construction according to my present invention is also far more stable than other constructions of a known kind, as the body which is to be caused to rotate, for instance a can, is located considerably nearer the point of rotation than is the case in the normal machines of this kind.

In addition to this the number of component parts is very small, which has a very important effect on the price, where such machines are manufactured on a large scale. The number of parts exposed to direct wear and tear is exceedingly small, which ensures a longer life for the machine and greater reliability in working.

I claim:

1. A motor for driving hydro-extractors comprising stator windings fixed to a casing, a column, a core fixed to said column, a rotor between the pole pieces of the stator windings and the core, the rotor, the core, and the pole pieces of the stator being provided with spherical bounding surfaces, the centres of the latter substantially coinciding with the point of support of the shaft which supports the hydro-extractor.

2. A motor for driving hydro-extractors comprising stator windings fixed to a casing, a column, a core fixed to said column, a rotor between the pole pieces of the stator windings and the core, the rotor, the core, and the pole pieces of the stator being provided with spherical bounding surfaces, the centres of which substantially coinciding with the centre of a spherical depression arranged at the top of the column in which depression a convex spherical surface of a spherical bearing which supports the hydro-extractor can freely turn.

3. A motor for driving hydro-extractors comprising stator windings fixed to a casing, a column, a core consisting of a laminated body fixed to said column, a rotor between the pole pieces of the stator windings and the core, the rotor, the core, and the pole pieces of the stator being provided with spherical bounding surfaces, the centres of which practically coinciding with the point of support of the shaft which supports the hydro-extractor.

4. In a motor of the kind described, a column, a rotor mounted on said column and provided with a weight in the form of a disc having a central opening of a larger diameter than the column.

In testimony whereof I affix my signature.

H. A. ROMP.